(12) United States Patent
Valenzuela et al.

(10) Patent No.: US 7,123,339 B2
(45) Date of Patent: Oct. 17, 2006

(54) PROCESSING VARIABLE AREA FILM SOUNDTRACKS

(75) Inventors: Jaime Arturo Valenzuela, Alhambra, CA (US); Vincent Richard Williams, La Palma, CA (US)

(73) Assignee: Thomson Licensing, Boulogne (FR)

( * ) Notice: Subject to any disclaimer, the term of this patent is extended or adjusted under 35 U.S.C. 154(b) by 168 days.

(21) Appl. No.: 10/490,563

(22) PCT Filed: Aug. 30, 2002

(86) PCT No.: PCT/US02/27598

§ 371 (c)(1),
(2), (4) Date: Mar. 17, 2004

(87) PCT Pub. No.: WO03/025914

PCT Pub. Date: Mar. 27, 2003

(65) Prior Publication Data

US 2004/0189946 A1  Sep. 30, 2004

Related U.S. Application Data

(60) Provisional application No. 60/322,700, filed on Sep. 17, 2001.

(51) Int. Cl.
G03B 31/00 (2006.01)
G03B 31/02 (2006.01)

(52) U.S. Cl. .................. 352/27; 352/5; 352/26
(58) Field of Classification Search .......... 352/5, 352/11, 26, 27
See application file for complete search history.

(56) References Cited

U.S. PATENT DOCUMENTS

| 4,577,302 A * | 3/1986 | Allen ................. 369/44.11 |
| 5,526,075 A * | 6/1996 | Carlsen, II ............. 352/26 |
| 5,633,977 A * | 5/1997 | Inoue et al. ............ 386/127 |
| 2003/0165087 A1* | 9/2003 | Poetsch et al. ......... 369/13.56 |

FOREIGN PATENT DOCUMENTS

| DE | 19729201 A1 | 1/1999 |
| EP | 0 352 016 | 1/1990 |
| EP | 1091573 A2 | 4/2001 |

OTHER PUBLICATIONS

Richter D. et al., "Restoration of Optical Variable Density Sound Tracks on Motion Picture Films by Digital Image Processing", Optim. Proceedings of the International Conference on Optimization of Electrical and Electronic Equipments, XX, XX, vol. 3, May 11, 2000, pp. 793-798, XP008002764.
Search Report *.

* cited by examiner

*Primary Examiner*—Rodney Fuller
(74) *Attorney, Agent, or Firm*—Joseph J. Laks; Robert B. Levy

(57) ABSTRACT

A method for playback of film with an analog optical sound track the method comprises the steps of forming an image of only said analog optical sound track. Storing the image and representing part of the stored image as a spatial image. Processing the spatial image to form a median value and converting the median value of the spatial image to a signal representative of an audio signal represented in said sound track. Repeating the representing and processing steps to form median values for all of the image of the analog optical sound track.

16 Claims, 5 Drawing Sheets

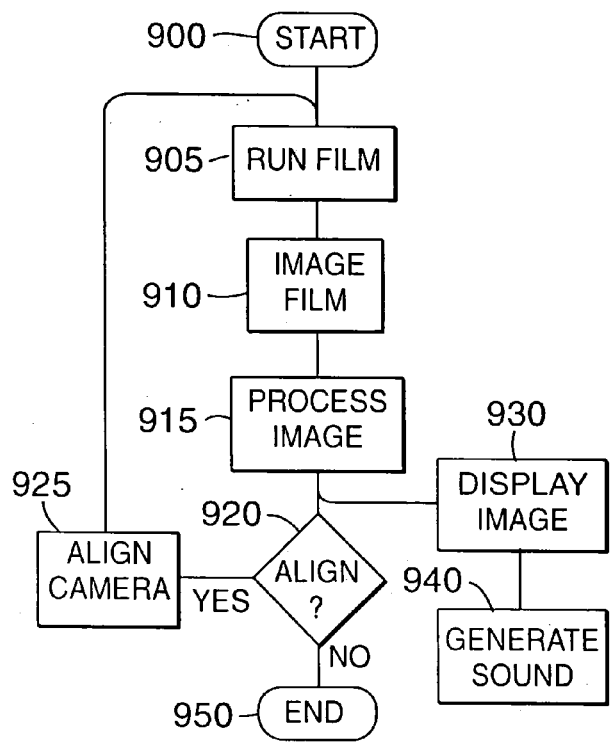
FIG. 9A
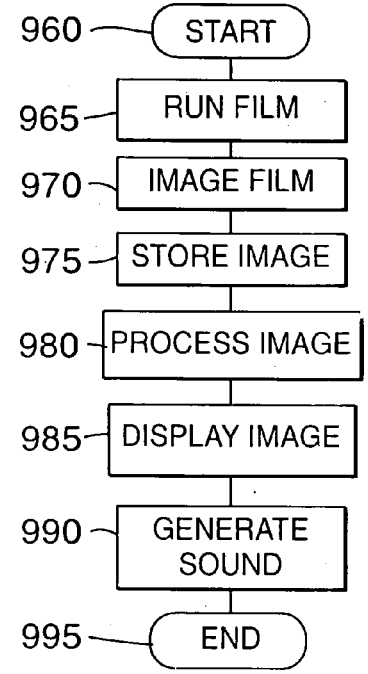
FIG. 9B
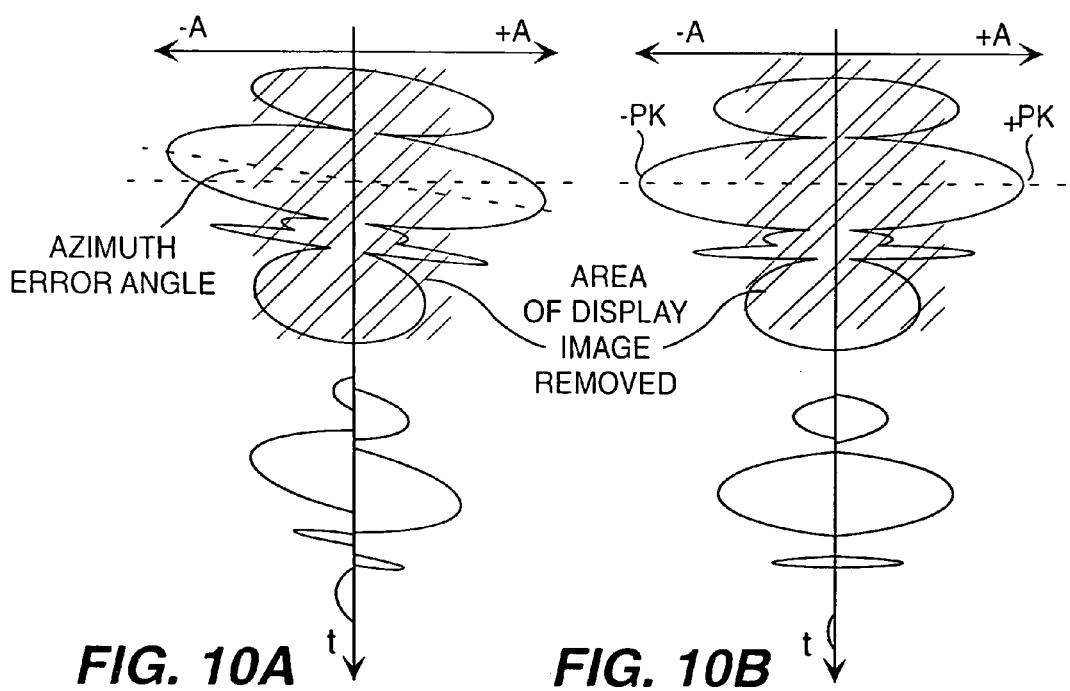
FIG. 10A    FIG. 10B

PROCESSING VARIABLE AREA FILM SOUNDTRACKS

This application claims the benefit under 35 U.S.C. § 365 of International Application PCT/US02/27598, filed Aug. 30, 2002, which claims the benefit of U.S. Provisional Application No. 60/322,700, filed Sep. 17, 2001.

This invention relates to the reproduction of optically recorded analog sound tracks and in particular to the restoration of recorded signal quality.

BACKGROUND

Optical recording is most common format employed for analog motion picture sound tracks. This analog format uses a variable area method where illumination from a calibrated light source is passed through a shutter modulated with the audio signal. The shutter opens in proportion to the intensity or level of the audio signal and results in the illumination beam from the light source being modulated in width. This varying width illumination is directed to expose a monochromatic photographic film which when processed, for example, results in a black audio waveform envelope surrounded at the waveform extremities by a substantially clear or colored film base material. In this way the instantaneous audio signal amplitude is represented by the width of the exposed and developed film track. FIG. 1 depicts in greatly simplified form an arrangement for recording a variable width analog audio sound track.

A second method can be employed for analog motion picture soundtracks where the audio signal causes the total width of the photographic audio track to be variably exposed. In this method, termed variable density, the exposure of the complete track width is varied in accordance with the intensity of the audio signal to produce a track which varies transmission, for example, between substantially clear or colored base film material and low transmission or high density areas of exposed and developed photographic material. Thus the instantaneous audio signal amplitude is represented by a variation in the transmission of illumination though the exposed and developed film track width.

Hence with either variable density or variable area recording methods the audio modulation (sound) can be recovered by suitably gathering, for example by means of a photo detector, illumination transmitted through the sound track area.

These analog film sound recording techniques can be subject to imperfections, physical damage and contamination during recording, printing and subsequent handling. Since these recording techniques use photographic film, the amount of light used in recording (Density) and the exposure time (Exposure) are critical parameters. The correct density for recording can be determined by a series of tests to determine the highest possible contrast whilst maintaining a minimized image spread distortion.

Image spread distortion results when a spurious fringing image is produced beyond the outline of the wanted image. Typically image spread distortion results from diffusion of light within the film base, between the halide grains and the surrounding gelatin. This scattering of light causes an image to be formed just beyond the exposed area. Optimal negative and positive density and exposure can yield a clean sharp well defined image. However, with variable area recorded negatives, image spreading causes the peaks of the audio modulation envelope appear to be rounded while the valleys of the envelope appear to be sharpened and decreased in width. This image distortion causes a non-symmetrical envelope distortion which translates into both odd harmonic distortion and cross modulation distortion in the recovered audio. As the recording density is increased the image spreading increases and consequently becomes evident as sibilance, initially in the higher frequency content, because of the shorter recorded wavelengths. Increasing the recording density further, causes the distortion to become noticeable at progressively lower frequencies in the recorded spectrum.

Sound recording film is generally only sensitive blue illumination and employs a gray anti-halation dye to substantially reduce or eliminate halation effects. Halation can result from reflections from the back of the film base causing a secondary, unwanted exposure of the emulsion. Typically a fine grain and high contrast emulsion is used with a control gamma between 3.0 and 3.2.

The frequency response of these recording methods is determined by various parameters, for example, the speed at which the shutters open and close, the exposure of the film, and the modulation transfer function MTF of the film which is directly related to light diffusion. The higher the exposure time the lower the frequency bandwidth of the recording.

With these optical recording methods the resulting audio signal to noise ratio can be optimized by use of a high contrast image. For example, the darker audio envelope waveshape and the clearer the surroundings, the cleaner or quieter will be the sound. However, there is a limitation to the possible density at which the film can be exposed at without introducing audio distortion due to image spreading in the film emulsion.

Optimum density presents a compromise between signal to noise ratio and image spread distortion. An optimum density can be determined by test exposures to find an acceptably low value for cross modulation distortion resulting from image spreading. Frequently older or archival audio tracks are improperly recorded and can exhibit severe distortion. However, often some image spread distortion is tolerated in order to obtain an improved audio signal to noise ratio. FIG. 2 shows a somewhat complementary variation of cross modulation distortion with density when printing from negative to positive film sound stock.

In addition to density and image spread distortion other imperfections can result, for example the density of the exposed or unexposed areas can vary randomly or in sections across or along the sound track area. During audio track playback such density variations can directly translate into spurious noise components interspersed with the wanted audio signal.

A further source of audio track degradation relates to mechanical imperfections variously imparted to the film and or it's reproduction. One such deficiency causes the film, or tracks thereon, to weave or move laterally with respect to a fixed transducer. Film weave can result in various forms of imperfection such as amplitude and phase modulation of the reproduced audio signal.

Analog optical recording methods are inherently susceptible to physical damage and contamination during handling. For example, dirt or dust can introduce transient, random noise events. Similarly scratches in either the exposed or unexposed areas can alter the optical transmission properties of the sound track and cause sever transient noise spikes. Furthermore other physical or mechanical consequences, such as the film perforation, improper film path lacing or related film damage can introduce unwanted cyclical repetitive effects into the soundtrack. These cyclical variations can introduce spurious illumination and give rise to a low frequency buzz, for example having an approximately 96 Hz rectangular pulse waveform, rich in harmonics and interspersed with the wanted audio signal. Similarly picture area tight leakage into the sound track area can also cause image related audio degradation.

A German application DE 197 29 201 A1 discloses a telecine which scans optically recorded sound tracks. The disclosed apparatus scans the sound information signal and applies two dimensional filtering to the output values. A further German application DE 197 33 528 A1 describes a system for stereo sound signals. An evaluation circuit is utilized to provide only the left or the right sound signal or the sum signal of both as a monophonic output signal.

Clearly an arrangement is needed that allows optically recorded analog audio sound tracks to reproduced and processed to not only substantially eliminate the noted deficiencies but to enhance the quality of the reproduced audio signal.

SUMMARY OF THE INVENTION

An inventive method for ameliorating scratches of an analog optical sound track during film playback. The method comprises the steps of forming an image of only said analog optical sound track. Storing the image and representing part of the stored image as a spatial image. Processing the spatial image to form a median value and converting the median value of the spatial image to a signal representative of an audio signal represented in said sound track. Repeating the representing and processing steps to form median values for all of the image of the analog optical sound track.

In a further advantageous arrangement a median value can be produced using other mask or window sizes and shapes to advantageously favor the formation of median values with pixel neighborhoods from fewer successive image scans but including greater numbers of across the sound track width. Similarly yet further pixel neighborhoods can be defined by masks that favor multiple scans with a lesser contribution of consecutive pixels from the track width in the formation of the median value.

BRIEF DESCRIPTION OF THE DRAWINGS

FIGS. 9A and 9B are charts representing sequences associated with various inventive arrangements.

FIGS. 10A and 10B are diagrams representing a sound track envelope reproduced with an azimuth error in FIG. 10A and corrected in FIG. 10A.

DETAILED DESCRIPTION

Figure 1:
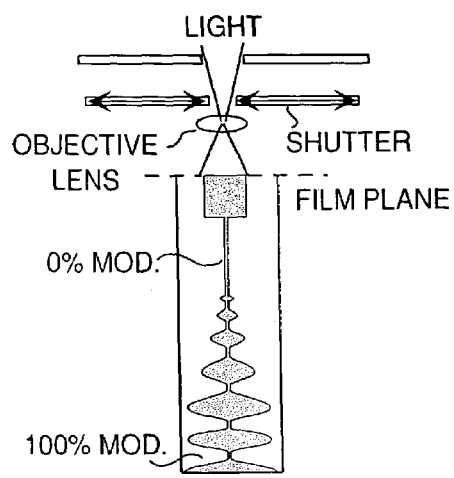
FIG. 1 is a diagrammatic representation of an audio soundtrack using a variable area recording method.
Figure 2:
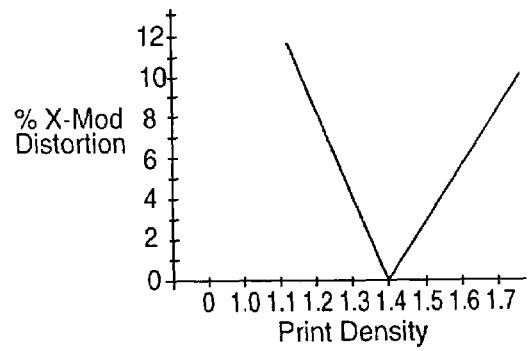
FIG. 2 shows relationships between cross-modulation distortion and recording density.
Figure 3:
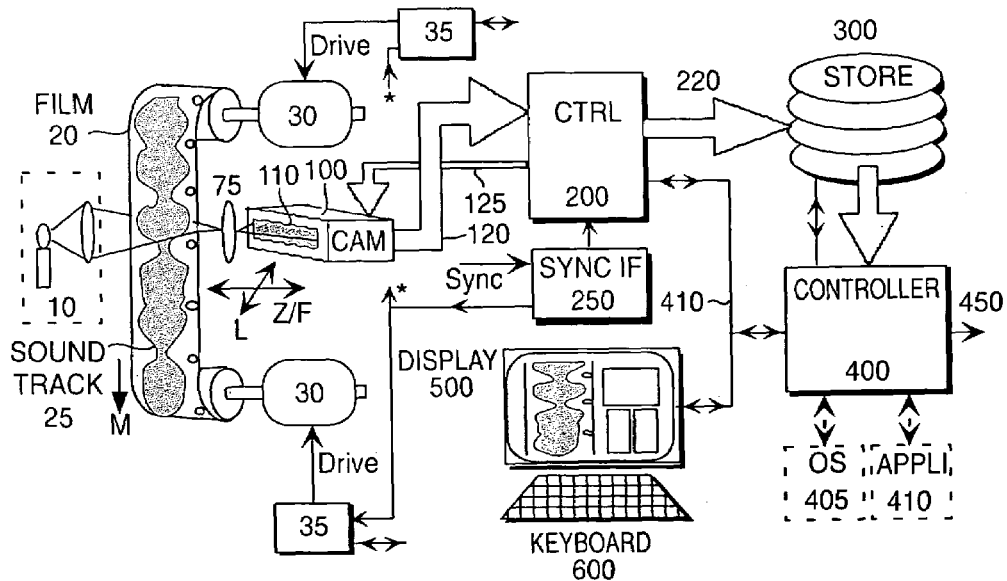
FIG. 3 is a block diagram of an inventive arrangement for processing optically recorded analog audio sound tracks.

The block diagram of FIG. 3 shows an inventive arrangement for reproducing and processing an optically recorded analog audio sound track. Typically a light source 10 is projected onto film 20 which includes an audio sound track 25, depicted in FIG. 3 with an exaggerated width dimension. The audio signal my be represented as suggested in track 25 by means of a variable area recording method, however the audio signal may also be represented by corresponding variations in density substantially across the width of the sound track area. In a conventional film sound reproducer light from source 10 is transmitted through film 20 and track 25 in accordance with the method employed for exposing the sound track. However, the resulting varying intensity light, modulated by the soundtrack, is gathered by a photo sensor such as a photo cell or solid state photo detector. The photo sensor usually generates a current or voltage in accordance with the intensity of the transmitted light. An analog audio output signal results from the photo sensor and this is generally amplified and often processed to alter the frequency content to improve or mitigate deficiencies in the acoustic properties of the recorded track. However, such frequency response manipulation, is generally incapable of remedying the deficiencies without adversely effecting the wanted audio content.

In the inventive arrangement shown in FIG. 3, light from source 10 is guided by a fiber optic means (not illustrated) to from a projected beam of light for illuminating sound track 25. The light is modulated in intensity by the sound track and is collected by optical group 75. Optical group 75 includes a lens assembly, extension tube and bellows which are arranged to form an image of the complete sound track width across the width of a CCD line array sensor 110 which forms part of camera 100. Camera 100, for example a Basler type L160, is controlled by frame grabber 200, for example, Matrox Meteor II LVDS digital board which synchronizes the image capture and outputting of an 8 bit digital signal representing the line scanned image of sound track 25 as the film moves continuously through the projected beam of light. The CCD line array sensor 110 has 2048 pixels and provides a parallel digital output signal 120, quantized to 8 bits and capable of operating with a bit rate in the order of 60 MHz.

The digital image signal 120 represents successive measurements across the width of the sound track which are captured as an 8 bit gray scale signal representing the instantaneous widths of exposed and unexposed areas of the sound track. This continuos succession of track width images or measurements are stored by an exemplary RAID system 300 as a continuous digital image of the optical track.

An operating system can be resident in controller 400 or as depicted by block 405 which provides the user with a visual menu and control panel presentation on display 500. Controller 400 can a personal computer or can be implemented as a custom processor integrated circuit. However, the computer controller must support the high transfer rates associated with the camera data and requires at least 512 MB of RAM together with an Ultra SCSI 160 interface that can sustain the high transfer rates. In addition a dual processor computer can allow parallel processing which can increase both processing speed and performance.

Camera 100 has a line array CCD sensor with 2048 pixels and provides an 8 bit parallel digital output signal, 120, in accordance with LVDS or RS 622 output signal formats. The use of a 2048 pixel line array sensor provides sufficient resolution to capture the soundtrack envelope image without significant frequency response distortion. In addition the camera can be controlled by a frame grabber 200, which in addition provides synchronization to NTSC or HD television sync pulses via sync interface 250, and also permits an output data rate sufficient to capture sound track images at normal operating speeds of nominally 24 fps.

Thus under control of frame grabber 200 and responsive to user control from display and keyboard 600 the digital image is transmitted via a frame capture card 200 for storage on a hard disk memory array 300. For example the scanning rates employed in this advantageous arrangement result in an exemplary file size in the order of 4 giga bytes per minute and this bitstream is supplied for storage by a striped raid system 300 which facilitates storage of the large sound track image video file while providing rapid transfer rates.

The optical system, bellows extension tube and lens 75 are accurately positioned to image the standardized recorded track positions, however manual adjustments are provided to permit both focusing, exposure and image size adjustment or zoom control to allow the recorded film area to substantially fill the maximum sensor width with peak audio modulation. The camera mounting system also facilitates both lateral and azimuth adjustments. Lateral adjustment L allows laterally mis-positioned tracks to be imaged, for example to eliminate sprocket or perforation generated buzz or picture related light spill. Furthermore in severe situations where lateral image adjustment fails to eliminate audible sprocket hole or perforation noise, or picture spill, the camera and lens can be adjusted to substantially fill the sensor width with a part of the recorded envelope positioned to avoid the offending illuminating noise source.

The selection of lens and optical system requirements are determined largely by the 35 mm audio optical track width and the width of the imager array. A 35 mm optical track has a standardized width of 2.13 mm, and the approximate length of the imager is about 20.48 mm based on a pixel size of 10 microns. Thus to enable the maximum width of a 35 mm sound track to fill the imager width requires an image magnification of about 10:1. Similarly for a 16 mm track having a width of 1.83 mm, in order to fill the sensor width requires the addition of a 56 mm extension tube or bellows.

In addition to the imaging considerations, the desired bandwidth of the processed audio signal must be considered. For example, if a reproduced audio bandwidth of 15 kHz is required, a sampling or image scanning rate of 30 kHz is needed. Thus with an exemplary sampling rate of 30 kHz, the camera will output 2048 bytes or 8 bit words for each image scan (audio track line scan) producing an output data rate of $2048*30*10^3$ or 61.4 mega bytes per second. Hence one minute of sound track requires approximately 3.68 giga bytes of storage. Such storage capacity requirements can be provided by an exemplary striped raid system such as an Ultra Wide SCSI 160 drive.

Figure 4A:
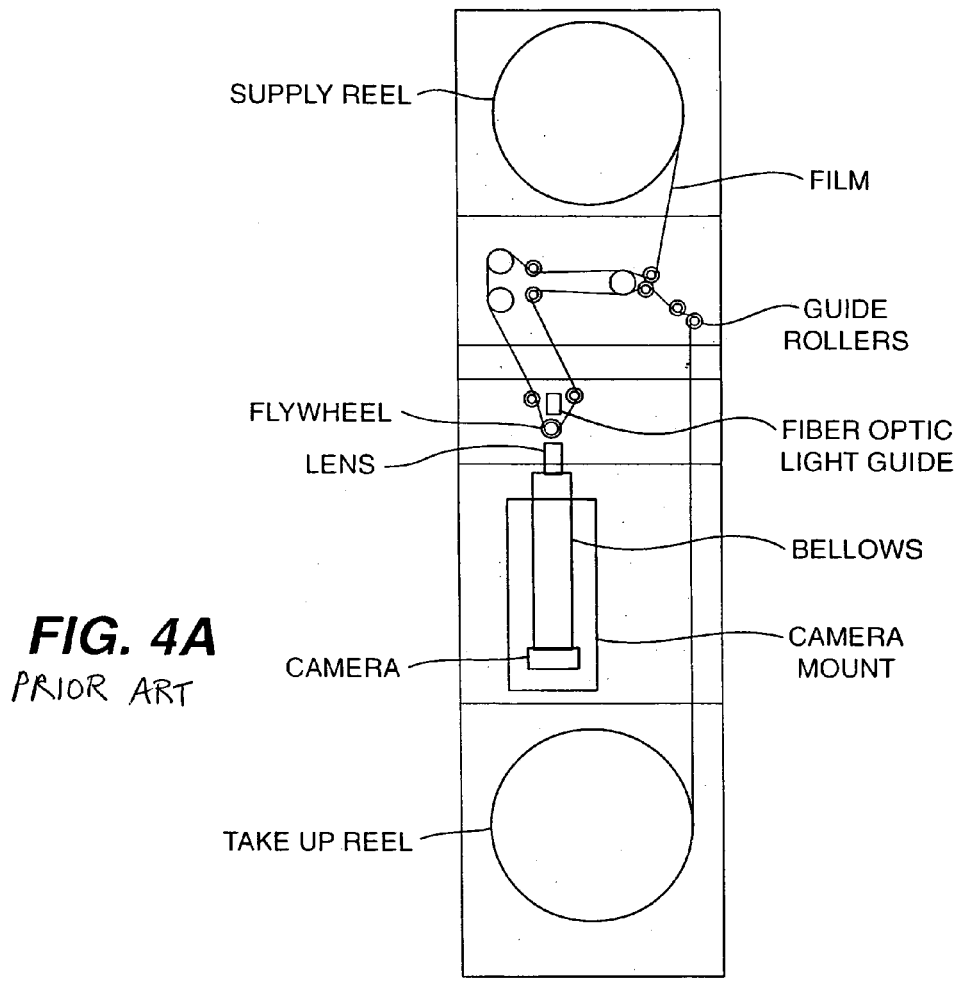
FIGS. 4A through 4C show a 16 mm film gauge implementation of the inventive arrangement of FIG. 3.

FIG. 4A illustrates an exemplary magnetic film transport manufactured by Magna-tech Electronic Co. Inc. which forms the basis for the inventive scanning arrangement and provides a servo controlled film transport system with adequate room for mounting the line array CCD camera. A major requirement is that of good film guidance and the provision of a steady film path to prevent variation of film focus as it travels between the light source and camera. Through experimentation it was discovered that optimum film stability for scanning was achieved at a location where the film wraps around a flywheel. Although film image surface is curved at the flywheel the use of line array scanner looking orthogonally and without azimuth errors at the film obviates problems of depth of field and sound track intermodulation, and phasing or flanging distortions.

Figure 4B:
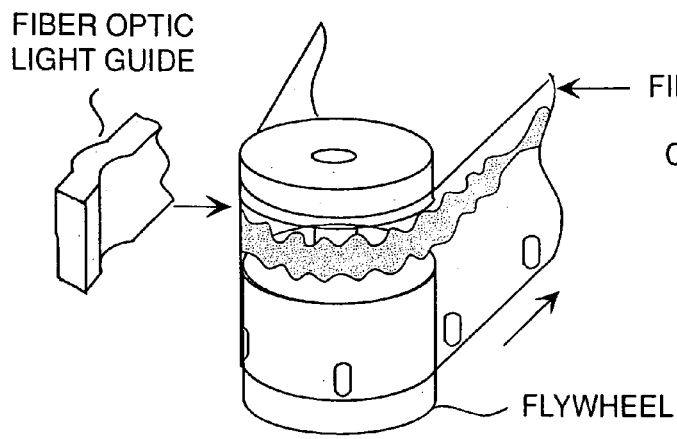
Figure 4C:
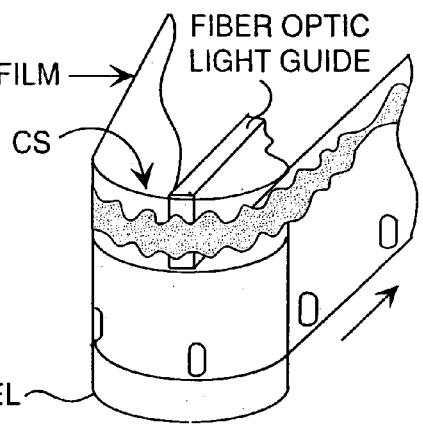

An exemplary flywheel is depicted with a 16 mm gauge film in FIG. 4B together with a cranked fiber optic light guide which facilitates orthogonal illumination of the film without obscuration by the cut away flywheel center. In an alternative arrangement, illustrated in FIG. 4C, an exemplary flywheel provides support for a major part of the film width and obviates the requirement for the cranked light guide shown in FIG. 4B. In this arrangement the 16 mm gauge film is supported by the flywheel over the majority of the film width with the exception of a nominally 3 millimeter edge region which contains the sound track or tracks. Similarly when operating with 35 mm gauge film an edge region of about 8 mm containing the sound modulation extends beyond the exemplary flywheel of FIG. 4C. The wrapping action of the film around the flywheel forms a partially cylindrical structure (CS) which provides rigidity and significant stiffness and hence resistance to edge deviation or flutter effects. In this way the advantageous wrapped positioning of the sound track area relative to the flywheel ensures a stable film edge and defocusing of the image is largely precluded.

The inventive film sound processing system is activated by keyboard 600 or mouse selection of an icon (Digital AIR) which results in a Windows® like control screen arrangement presented on display screen 500. Various operating modes such as Preview, Record, Stop, Process and Export are presented as tool bar functions in a border area of the display. Initially the Preview mode can be selected from the tool bar functions which advantageously starts the sound track in motion and forms a sound track image on display screen 500. The gray scale image allows alignment of camera and optics to the recorded sound track. Optical group 75 is adjusted to ensure that peaks of the sound track image substantially fill the imager 110 width and to provide good image signal to noise ratio by ensuring proper CCD exposure which can differ between negative and positive prints and is also dependent on the type of film stock.

Advantageously the real time image provides not only pictures of the sound track but also shows the presence of interference generating illumination emanating from the sprocket holes, or the picture area which can contaminate the sound track. This unwanted light ingress can be eliminated by using the on screen camera image to permit manipulation of optical group 75 to remove such unwanted audio contributions by carefully framing the soundtrack using picture zoom, pan and tilt. In addition the sound track image can be examined in detail by electronically magnifying selectable sections of the display envelope to permit camera azimuth alignment when reproducing a test film known as a buzz track. The magnified image is presented with an electronically cursor line which permits the evaluation of any time or phase difference between peaks in the modulation envelope. With optimized azimuth alignment modulation peaks appear concurrently with substantially equal magnitude but opposite polarity. An optimum azimuth adjustment will produce concurrently maximized envelope peaks. Misalignment of azimuth between the camera an the sound track can result in an image which captures temporally different audio information, such as can occur with a stereo audio track pair. FIG. 10A is diagram representing a sound track envelope reproduced with an exemplary and exaggerated azimuth error.

Shown on the same time axis of FIG. 10A is a processed or electronically cored image showing the temporal displacement resulting from an azimuth error between the camera imager camera and the sound track. FIG. 10B is the same envelope image as FIG. 10A but reproduced without an azimuth error, and shown below on the same time axis is the electronically cored image which indicates that the envelope peaks have been scanned substantially concurrently and are of similar amplitudes.

Figure 5:
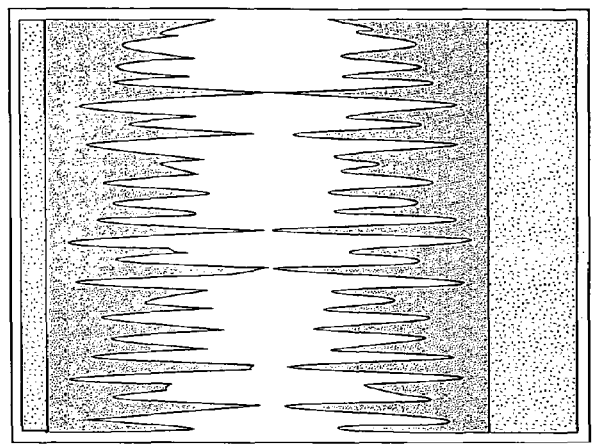
FIG. 5 shows a scanned gray scale analog image of a variable area audio soundtrack subject to certain deficiencies.

An example of a Preview mode sound track image is shown in FIG. 5. The gray scale picture in FIG. 5 is of a duplicate negative sound track which includes various impairments. For example, on the right side of the sound track image unwanted illumination can be seen emanating from film perforations, a defect indicative of misalignment during duplication. In addition the sound track has a reduced width and shows lateral scratches probably incurred on the original negative. Hence the advantageous real time sound track image permits rapid visual alignment of the camera and optics, rather that reliance on acoustically determined positioning. The scanning alignment sequence is depicted in the sequence chart of FIG. 9A. The sound track image facilitates the substantial elimination of deficiencies resulting from prior misalignment. Following camera image optimization, framing, focus, exposure, etc., the Record mode is selected from the tool bar and the sound track is scanned, digitized as exemplary 8 bit words and stored in memory 300. Upon completing the scanning and storage steps the digital sound track image is processed by selecting the Processing mode from the tool bar.

Figure 6:
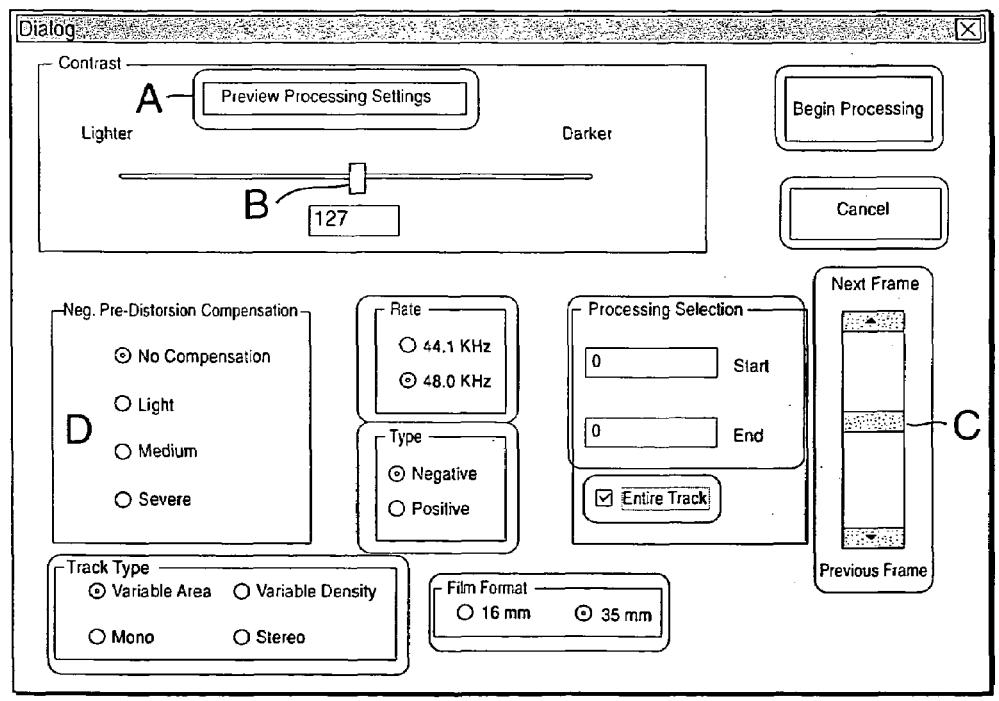
FIG. 6 illustrates a control panel used in accordance with the inventive arrangement of FIG. 3.

The processing control panel shown in FIG. 6 allows the operator to select and optimize film specific processing to be performed on the stored sound track image thereby obviating the potential for damaging the film material during repeated play back for optimization. Advantageous processing algorithms resident, for example in controller 400 or as depicted within block 410 are selected from the on screen menu via keyboard 600 and applied to data selectively retrieved from the stored digital image in system 300. The algorithms employed to remedy certain sound track deficiencies will be explained, however, the corrective processing sequence is depicted in the chart of FIG. 9B. The processed and renovated digital signal is converted for outputting as digital audio signal 450 with selectable exemplary formats such as WAV, MOD, DAT, DA-88.

Having stored the complete soundtrack as a digital image the inventive Processing mode is selected from the on screen tool bar. The processing control panel shown in FIG. 6 allows the operator to select and optimize processing specific to the stored sound track image. For example film gauge is selectable, together with the film type, positive or negative and audio modulation method for example, unilateral variable area, bilateral variable area, dual bilateral variable area, stereo variable area or variable density. The advantageous processing algorithms are selected from the on screen menu and applied to the stored digital image accessed from storage system 300 for processing by the CPU or a DSP card of controller 400.

Sound track deficiencies can result from the various causes described previously. However, more specifically, dirt, debris, transverse or diagonal scratches or longitudinal cinches in a negative can produce white spots when printed. These flaws generate clicks and crackles. Such white spots tend to affect the dark areas of the track and are more noticeable during quiet passages whereas noise occurring during Loud passages often originates in the clear areas of the print. Low frequency thuds or pops often result from relatively large holes or spots in a positive soundtrack formed as a consequence processing problems. Hiss can result from a grainy or slightly fogged track area. Sibilance yields spitting S sounds and is particularly objectionable. Typically sibilance results from image spreading within the photographic emulsion of variable area recordings and gives rise to cross modulation distortion of audio signals recorded on the track.

Although the scanned audio track is represented as a continuous envelope image it was advantageously recognized that sections of the envelope image can be read from memory 300 and configured in RAM for processing using spatial image techniques. An first algorithm was developed using Matlab® to facilitate loading the audio envelope image as matrix of values to permit the use of spatial image processing. By gathering small consecutive pieces of the audio envelope to form spatial image sections it is possible with a second algorithm to identify and eliminate extraneous pixels that differ from surrounding pixels. Without processing, such extraneous pixels can produce transient noise in the reproduced audio signal. In this second algorithm a small mask or window comprising, for example, 3×3 pixels is formed with groups of three pixels values from three adjacent line scans. This window is moved or stepped across the spatially configured sound track image data with the pixel of interest, or subject pixel centered in the window. If the value of the subject pixel differs from the value of the surrounding pixels it is replaced with the value of the surrounding pixels. Thus this algorithm is suited to use with signals that have been subject digital threshold processing, which will be described, where isolated, contrary data values can in general be associated with erroneous and ultimately audio noise generating consequences. Hence such contrary data values are replaced by the predominate value within the window. Thus each pixel of the scanned audio track is tested and replaced to form a processed soundtrack image in RAM. In edge areas padding is applied to prevent erroneous pixel replacement.

Scratches across sound track can produce transient or impulsive noise effects such as loud pops or clicks. The simple rule of pixel replacement described in the second algorithm is less effective with contiguous contrary value pixels. However, this form of transient noise is advantageously eliminated by a third algorithm which is applied to spatially configured track image sections of the stored exemplary 8 bit digital envelope signal. This third algorithm uses a further spatial image processing technique to derive median values for each pixel of each image section across the width of the track. These median values are then used to replace the scanned image data across the track area. The median filter is implemented by an exemplary mask or window comprising, for example 9×9 pixels, which is progressively stepped, pixel by pixel across a spatial representation of the audio envelope data. The center of the window represents the pixel to be corrected. The pixel values of the track image positioned under the window are sorted or ranked in amplitude order. The middle value of the rank ordered set is then substituted for the actual track image value of the center pixel of interest, this process is then repeated for the next pixel across the width of the spatially configured track image. Ultimately every pixel representing the scanned audio track is evaluated and if necessary replaced forming a processed soundtrack image in RAM.

Other mask or window sizes and shapes can be advantageously employed to favor formation of median values. For example a 3×6 mask formed from three successive image scans across the sound track width will form a pixel neighborhood that favors the track width in the formation of the median value. Alternatively the mask or window can be advantageously favor formation of a median value from a pixel neighborhood extending over a greater number of successive scans but occupying less track width for example by use of a 9×3 mask. In addition exemplary masks can be constructed to provide diagonal weighted image processing.

Because the median filter window analyzes data from pixel groups, with some occurring in adjacent line scans, an amount of blurring or data smoothing can result because the middle value of the rank ordered set can be representative of a data value occurring at a different spatial and or temporal scanned location. However, this smoothing effect can be compensated with a two dimensional high pass filter which can sharpen or substantially restore the image. The median filter process is computationally intense and therefore time consuming but can be optimized by recognizing that certain values within the window wilt not change from step to step.

Following median filtering of the audio envelope image data which removes aberrant values a further operation is performed termed Contrast. The Contrast process advantageously recognizes that the variable area recording method employs only two states, one to represent the audio envelope, the second to represent the envelope's absence. Thus the sound track has some areas that are substantially clear and others that are opaque. Advantageously processing screen FIG. 6 allows sections of the stored image to be previewed, by selecting button A, and viewing the resulting image as contrast slider B is varied. Contrast slider B allows a threshold value of a further software algorithm, or hardware implementation to be varied about a nominal center range decimal value of 127 for an exemplary 8 bit range of image values scanned from the sound track. The algorithm classifies the pixels according to their intensity value and splits the range of values in two. Thus for images digitized with values less than the selectably adjusted threshold the actual scanned digital value, or median filtered value, is replaced with a new low digital value, for example representing decimal 0, and substantially equal to black or zero film transmission. Similarly for digitized images values greater than the adjusted threshold value the actual value is replaced with a new high value substantially equal to white or decimal value 255. In this way grayscale variations in the nominally clear and opaque film areas are removed and defects causing variable light transmission through the track are eliminated. This digital thresholding or binarization method re-quantizes the stored digital audio envelope image into 2 states, represented by one bit. However, although contrast slider B offers the visually apparent ability to remove or eliminate dirt, scratches and artifacts from the on screen preview image, the result must be balanced, and acoustically judged against any consequential, unintentional and unwanted changes to the audio content.

Figure 7:
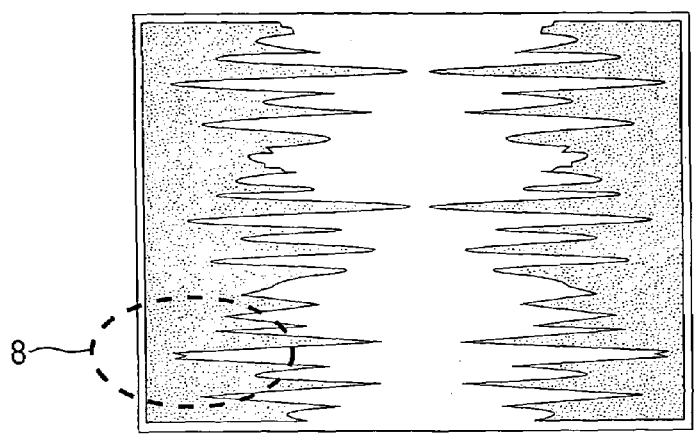
FIG. 7 shows a processed scanned image of an audio soundtrack in accordance with a further inventive arrangement.

Vertical slider bar C provides access to 10 sections of the recorded image data, assigned on the basis of file duration, number of frames or running time. These 10 sound track sections allow the effect of differing digital threshold values, determined by contrast slider B, to be evaluated on track areas containing both loud and quiet passages. The advantageous digital thresholding or binarization process improves the signal to noise ratio of the image signal and aids in the identification of the edges of envelope image. FIG. 7 shows a section of a soundtrack image subject to digital threshold processing.

Image spread distortion effects variable area recordings and results in objectionable audio sibilance. Image spread distortion results during recording from scattering of light causing the growth of the image or fringe beyond the actual image outline. Since the spreading is exposure dependent the effect is initially evident in higher frequency or shorter wavelength audio content. Image spreading causes peaks of the audio modulation envelope to become rounded while the valleys of modulation envelope appear to be sharpened. Thus the sound image envelope becomes non-symmetrical and causes harmonic distortion and cross modulation of the audio content.

Once again spatial image processing techniques are advantageous used to significantly reduce or substantially eliminate sound track impairment due to image spread distortion. Various spatial image processing algorithms can be used to remove the envelope asymmetry caused by image spreading. In a exemplary algorithm Sobel filters can be used to find the outline of the audio envelope which is then further processed to identify valleys and peaks. In accordance with the slope and amplitude of the envelope, a weighted number of pixels are added to the envelope image and operational control can be provided a graphic user interface to control the weights of the corrective additions.

In a fourth advantageous arrangement morphological erosion filtering is employed to significantly reduce or eliminate the effect of image spread distortion of the audio track envelope. Erosion filtering is performed by analyzing each pixel of the spatially configured envelope image, usually in binary or thresholded form, with a structuring element, for example a 3×3 array having values of either one or zero. The structuring element is stepped over each pixel of the envelope spatial image with the center of the element covering the input pixel of interest. If the structuring element is an 3×3 array of ones then the output value of the pixel of interest is determined by the correspondence of the envelope pixel neighborhood surrounding the pixel of interest under the array, with the values in the array. If all the neighborhood pixels and the pixel of interest match the exemplary 3×3 array of ones, then the output value of the pixel of interest is not changed. However, as soon as any part of the 3×3 array straddles an edge in the exemplary thresholded envelope image, the pixel of interest is changed from a one to a zero. Thus with the exemplary 3×3 structuring element an envelope edge between white and black is detected by a leading one of the neighborhood pixels causing the adjacent center pixel, or pixel of interest, to assume the same value as the leading neighborhood pixel, thereby causing the white to black transition to move, shrink or erode into the white or binary one area.

With the exemplary 3×3 structuring element edges of the audio envelope are eroded by one pixel. The amount of image spreading can exceed the width of one pixel, however a second pass of the erosion filter will remove a second pixel but at the expense of processing time. In a further advantageous arrangement varying amounts of image spread correction can be selected, as indicated in area D of FIG. 6, with the desired degree of correction performed in a single processing step. Greater amounts of erosion can be achieved by use of a larger structuring element, for example with a 5×5 array, erosion of two pixels is achieved corresponding to the selectable correction of a medium degree of distortion. Similarly processing with a 7×7 structuring element erodes three pixels and represents the correction of sever distortion.

Morphological erosion filtering can be performed with a software algorithm, for example developed using Matlab®, or alternatively the filter function may be implemented with hard wired logic. However implemented, the representation of the audio track envelope in the spatial domain permits the advantageous use of erosion filtering techniques to mitigate image spread distortion, largely eliminate cross modulation and restore the audio track fidelity.

Figure 8A:
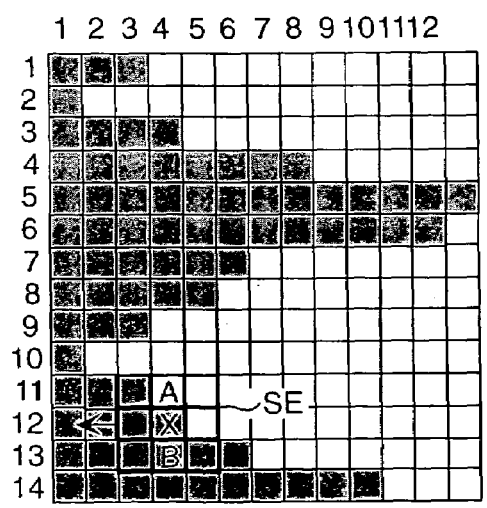
FIG. 8A illustrates diagrammatic representations of an exemplary elliptical area of the track image shown in FIG. 7.

FIG. 8A is a diagrammatic representations of exemplary elliptical area 8 of the threshold processed track image depicted in FIG. 7 and shows both white squares representing pixels or digital sample values and gray squares representing pixels or digital sample values from the black areas of FIG. 7. FIG. 8A includes a representation of exemplary 3×3 structuring element SE which is formed as follows,

|   | 0 | 1(A) | 0 |
|---|---|---|---|
| ← | 0 | 1(x) | 0 |
|   | 0 | 1(B) | 0 | having one values or active cells, A, X and B in the center column, with the pixel of interest marked with an (X). The structuring element is stepped across the spatial representation of the track image, pixel by pixel as indicated by the arrow. Because this structuring element has only three active cells, the processed value of center pixel X is determined by the laterally adjacent pixel neighborhood as shown, where the center value X is determined by the following erosion algorithm, if $(X \cdot A \cdot \overline{B}) + (X \cdot \overline{A} \cdot B)$ then $\_X' = \overline{X}$ else $\_X' = X$

•=AND,
+=OR,
‾=NOT,
X'=pixel in resulting image at the same position.

With this exemplary structuring element the output value of the pixel of interest is determined by the correspondence of the track image pixel neighborhood adjacent to the pixel of interest under the structuring element. If the adjacent neighborhood pixels and the pixel of interest match the structuring element, then the output value of the pixel of interest X' is not changed. However if either track image values under cells A or B fail to match then the pixel of interest X' is changed to the complementary value, for example zero.

Figure 8B:
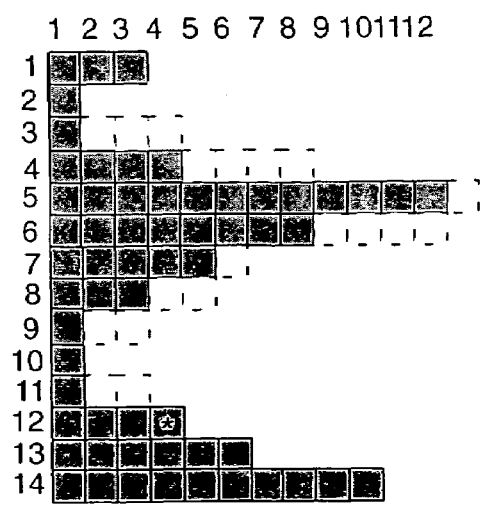
FIG. 8B illustrates the result of a erosion filter processing in accordance with a further inventive arrangement.

The enlarged processed track image of FIG. 8A shows the advantageous structuring element SE positioned to perform erosion filtering with FIG. 8B showing the resulting eroded image where eroded pixels are shown as white blocks with broken outlines with the current pixel of interest depicted with by a*symbol. The solid white squares that represented pixel values in FIG. 8A are omitted from FIG. 8B to allow the eroded pixels greater visibility.

Following the advantageous use of spatial image processing techniques the processed envelope image is converted back to sound signal by a further advantageous algorithm. The conversion algorithm sums the number of black pixels, for a negative track, or white pixels for a print, that represent the audio envelope for each line scan. This number of active pixels, representing the instantaneous amplitude which is then subtracted from the maximum amplitude value, for example 2048, which represents the total sensor pixel count. The resulting difference represents the instantaneous audio amplitude. Clearly the converse process is also possible where a nominally smaller number of non-envelope representative end pixels are counted and subtracted from the total sensor pixel count with the result representing the instantaneous audio amplitude. This audio amplitude value is then scaled to an appropriate audio signal format range. For example, using a 16 bit WAV file format the renovated audio values are scaled to fit a range of −32767 to +32768, where 0 represents DC. This audio conversion algorithm was developed using a Matlab® image processing toolbox. The Algorithm also includes a routine that prepares header appropriate for the file format and provides a streaming buffer to receive the WAV data following conversion. In addition to WAV formatted files a variety of other audio file formats are available including AIFF, MOD, DAT, DA-88 and DA-98HR.

In a further inventive aspect film weave which causes the sound track to vary in position relative to the audio transducer is advantageously corrected. The effects of film weave can appear as various types of modulation of the audio signal. Often an amplitude modulation results where the modulation is representative of the rate of film weave. In severe cases the reproduced audio signal can be subject to a low pass filtering effect where the cut off frequency is modulated by the film weave. In accordance with the inventive arrangement the presence of film weave results in the instantaneous audio envelope image also weaving or meandering on the sensor, however, this positional image variation only results in a variation of the pixels representing an envelope image absence. For example, in a negative track these pixels would represent a clear or high transmission part of the track and are positioned at the end regions of the array.

During the initial camera alignment the track image is observed at several film locations and if film weave is apparent the image centering can be adjusted to position the nominal center of wandering sound track path in the middle of the display image. The image size is then adjusted such that audio envelop peaks occurring at the maximum excursions of the track wander do not exceed the width of the CCD line array. Thus having centered the wandering envelope image the numbers of pixels at each end of the array are substantially similar for the centered track. Hence it can be appreciated that as the film weaves only the numbers, or distribution of the end (non envelope) pixels vary. However, the envelope pixel count, which represents the envelope amplitude, remains substantially constant because the envelope image moved, but remained on the sensor array. Thus the algorithm for converting the envelope image into an audio value advantageously eliminates and corrects the effects of film weave.

What is claimed is:

1. A method for playback of film with an analog optical sound track, comprising the steps of:
   a) forming an image of only said analog optical sound track;
   b) storing said image;
   c) representing part of said stored image as a spatial image;
   d) processing said spatial image to form a median value;
   e) converting said median value of said spatial image to a signal representative of an audio signal represented in said sound track; and
   f) repeating steps c) and d) to form median values for all of said image of said analog optical sound track;
   wherein said converting further comprises separating said median values for all of said image of said analog optical sound track into a first group of values representing said analog optical sound track and audio modulation, and a second group of values representing said analog optical sound track excluding said audio modulation.

2. The method of claim 1, wherein said forming step comprising scanning the width of only said analog optical sound track.

3. The method of claim 2, comprising repeating said scanning step for a duration of said playback.

4. The method of claim 3, wherein said forming step comprises digitizing said image of said analog optical sound track.

5. The method of claim 4, wherein said representing step comprises grouping said stored image date from successive scans to form said spatial image.

6. The method of claim 1, wherein said separating step comprises, forming a digital audio value from said first group of values to represent only audio modulation contained in said analog optical sound track.

7. The method of claim 1, wherein said step representing part of said stored image comprises forming said spatial image with a specific shape to favor a specific orientation median value formation.

8. A method for playback of film with an analog optical sound track, comprising the steps of:
   a) forming an image of only said analog optical sound track;
   b) storing said image;
   c) representing part of said stored image as a spatial image, said representing including formatting said spatial image with a specific shape to favor a specific orientation median value formation;
   d) processing said spatial image to form a median value; and
   e) converting said median value of said spatial image to a signal representative of an audio signal represented in said sound track.

9. The method according to claim 8, wherein said converting comprises separating said median values for all of said image of said analog optical sound track into a first group of values representing said analog optical sound track and audio modulation, and a second group of values representing said analog optical sound track excluding said audio modulation.

10. The method according to claim 9, wherein said separating comprises forming a digital audio value from said first group of values to represent only audio modulation contained in said analog optical sound track.

11. The method according to claim 8, wherein said converting comprises sorting said median values for all of said image of said analog optical sound track to form only two groups in accordance with said median values having one of a value representing said sound track with audio modulation and a value representing said sound track without audio modulation.

12. The method of claim 8, wherein said forming comprises scanning the width of only said analog optical sound track.

13. The method of claim 8, wherein said representing comprises grouping said stored image date from successive scans to form said spatial image.

14. A method for playback of film with an analog optical sound track, comprising the steps of:
   a) forming an image of only said analog optical sound track;
   b) storing said image;
   c) representing part of said stored image as a spatial image;
   d) processing said spatial image to form a median value; and
   e) convening said median value of said spatial image to a signal representative of an audio signal represented in said sound track, said converting comprises sorting said median values for all of said images of said analog optical sound track to form only two groups in accordance with said median values having one of a value representing said sound track with audio modulation and a value representing said sound track without audio modulation.

15. The method of claim 14, wherein said forming comprises scanning the width of only said analog optical sound track.

16. The method of claim 14, wherein said representing comprises grouping said stored image date from successive scans to form said spatial image.

* * * * *